United States Patent Office 3,713,983
Patented Jan. 30, 1973

3,713,983
METHOD FOR PREPARING A THERMOSTABLE AND ALKALI-STABLE PROTEASE
Tamotsu Yokotsuka, Nagareyama, and Takashi Iwaasa and Mituharu Fujii, Noda, Japan, assignors to Kikkoman Shoyu Co., Ltd., Noda-shi, Japan
No Drawing. Filed July 6, 1970, Ser. No. 52,685
Int. Cl. C12d 13/10
U.S. Cl. 195—66 R                         4 Claims

ABSTRACT OF THE DISCLOSURE

A thermostable and alkali-stable protease is prepared by culturing a microorganism belonging to the species *Thermopolyspora polyspora* in a medium at a temperature of 40° to 55° C. aerobically thereby to accumulate the protease in the medium and recovering the protease from the cultured medium. After the completion of the cultivation, mycelia are removed from the cultured medium by centrifuge, filtration or the like method, and the preparations of the thermostable and alkali-stable protease are obtained from the filtrate or the concentrated filtrate by the ordinary enzyme purification method such as salting out, dialysis, or the like. The thermostable and alkali-stable protease is useful for the food industry, fermentation industry, animal feed industry and pharmaceutical industry.

---

This invention relates to a method for preparing a thermostable and alkali-stable protease, and more particularly to a method for producing and recovering a thermostable and alkali-stable protease in a short period of time, utilizing a microorganism belonging to a thermophilic actinomycetes, *Thermopolyspora polyspora*.

Heretofore, only a few examples of producing a thermostable protease, utilizing a new strain of thermophilic actinomycetes similar to *Streptomyces casei* and *Thermomonospora lineata* (Japanese patent publication No. 3,479/65) or a thermophilic bacterium of the genus Bacillus have been known.

However, the thermostable protease is now in an increasing demand in the fields of food, animal feed and pharmaceutical industries, and its necessity is increasing year by year.

An object of the present invention is to provide a method for preparing a thermostable and alkali-stable protease.

Another object of the present invention is to provide a method for preparing a thermostable and alkali-stable protease economically in industrial scale.

Other object of the present invention will become apparent in the description which follows:

As a result of searches of microorganisms capable of producing a thermophilic protease, which exist in soils, the present inventors have succeeded in isolating from thermophilic actinomycetes showing a remarkable growth at such a high temperature of 45° to 55° C., strains Nos. 442 and 429 having a great ability to produce a thermostable and alkali-stable protease. These strains have been identified, as described below, to belong to the species *Thermopolyspora polyspora*. The present inventors have found that a thermostable and alkali-stable protease can be accumulated in a large amount in a short period of time in a medium by culturing these strains in a suitable medium at a temperature ranging from 40° to 55° C. and can be recovered very advantageously in an industrial manner by properly treating the cultured medium.

The present invention has been completed on the basis of these new findings. That is, the present method for preparing a thermostable and alkali-stable protease is characterized by culturing a microorganism belonging to the species *Thermopolyspora polyspora* in a medium at a temperature of 40° to 55° C. thereby to accumulate a thermostable and alkali-stable protease in the medium and recovering the protease from the cultured medium.

The microbiological properties of said strains Nos. 442 and 429 isolated by the present inventors are given in Table 1:

TABLE 1

| | Strain No. 442 | Strain No. 429 |
|---|---|---|
| (a) Morphological characteristics: | | |
| (1) Aerial mycelium | Straight or curved aerial mycelia are developed from substratum mycelium and irregularly branched. Sporephores of about 1 to 2 μ in legnth are formed on the branched aerial mycelia. In the most cases, the diameter of aerial mycelium is about 1 to 1.5 μ. | Same as the strain No. 442. |
| (2) Spore | 1 to 6 spores adhere to a sporephore. It seems that a sporephore having almost one spore adheres to an aerial mycelium, which has been just branched from the substratum mycelium. The spore has a size of about 0.8 to 1.2 μ and has some projections. | Do. |
| (3) Substratum mycelium | Straight. Branched state is principally alternate | Do. |
| (b) Cultural characteristics: [1] | | |
| (1) Czapek's agar-agar medium: | | |
| Growth | Not grown almost at all | Not grown almost at all. |
| Aerial mycelium | Very few, colorless, powdery | Very few, colorless, powdery. |
| Soluble pigment | None | None. |
| (2) Glucose-aspargine agar-agar medium. | Not grown at all | Not grown at all. |
| (3) Calcium malate agar-agar medium. | ...do... | Do. |
| (4) Nutrient agar-agar medium: | | |
| Growth | Normal and yellowishly clear | Normal and yellowishly clear. |
| Aerial mycelium | Not observed almost at all | Not observed almost at all. |
| Soluble pigment | None | None. |
| (5) Tyrosine agar-agar medium: | | |
| Growth | Weak or normal | Not grown at all. |
| Aerial mycelium | Very few and powdery | |
| Soluble pigment | Yellowish brown | |
| (6) Loffler's serium medium: | | |
| Growth | Normal | Normal. |
| Aerial mycelium | Normal and white | Normal and white. |
| Soluble pigment | Brown | Brown. |
| Liquefaction | Fast | Very fast. |
| (7) Potato-glucose agar-agar medium: | | |
| Growth | Good and yellowish brown | Good and yellow. |
| Aerial mycelium | Abundant, petal-like, and whitish brown | Abundant, velvet-like, smooth and whitish brown. |
| Soluble pigment | None | None. |

TABLE 1—Continued

| | Strain No. 442 | Strain No. 429 |
|---|---|---|
| (8) Egg albumin agar-agar medium: | | |
| Growth | Weak and colorless | Normal and colorless. |
| Aerial mycelium | Normal, powdery and white | Normal, powdery and white. |
| Soluble pigment | None | None. |
| (9) Glucose, yeast extract and malt extract agar-agar medium: | | |
| Growth | Normal, and light yellowish brown | Normal or good and yellowish brown. |
| Aerial mycelium | Normal and clearly greyish brown | Normal or abundant and light orange. |
| Soluble pigment | None | None. |
| (10) Bennet's agar-agar medium: | | |
| Growth | Weak or normal and yellowish, grey white | Not grown almost at all and light yellowish brown. |
| Aerial mycelium | Weak, velvet-like and whitish brown | Not adhered almost at all and pinky white. |
| Soluble pigment | None | None. |
| (11) Starch agar-agar medium: | | |
| Growth | Weak and whitish grey | Weak or ordinary and whitish grey. |
| Aerial mycelium | Weak and powdery | Weak and powdery. |
| Soluble pigment | None | None. |
| Hydrolysis | Weak | Weak. |
| (12) Carrot plug | Not grown at all | Not grown at all. |
| (13) Potato plug | do | Do. |
| (14) Gelatin medium: | | |
| Growth | Not grown almost at all | Not grown almost at all. |
| Liquefaction | Fast | Fast. |
| (15) Peptone-gelatin medium: | | |
| Growth | Not grown almost at all | Not grown almost at all. |
| Liquefaction | Fast | Fast. |
| (16) Cellulose medium | Not grown almost at all | Not grown almost at all. |
| (17) Litmus milk: | | |
| Growth | Grown within a medium | Grown within a medium. |
| Coagulation and peptonization | Fastly coagulated at weak acidity and peptonized | Fastly coagulated at weak acidity and peptonized. |
| (c) Physiological properties: | | |
| (1) Growth temperature range | 33–64° C | 34.5–62° C. |
| (2) Optimum growth temperature | 47–53° C | 50–53° C. |
| (3) Gelatin liquefaction | Fast | Fast. |
| (4) Starch hydrolysis | Weak | Weak. |
| (5) Peptonization of milk | Fast | Fast. |
| (6) Reduction of nitrate | No reduction | No reduction. |
| (7) Decomposition of cellulose | No decomposition | No decomposition. |
| (8) Melanine pigment | Formed | Formed. |

| | No. 442, growth state | No. 429, growth state |
|---|---|---|
| (d) Utilizability of carbon source— Carbon source: | | |
| Glucose | +++ | ++ |
| Mannitol | +++ | +++ |
| L-arabinose | − | − |
| Rhamnose | − | − |
| Xylose | − | − |
| Lactose | − | − |
| Inositol | − | − |
| Sucrose | ± | ± |
| Raffinose | ± | ± |
| Sorbitol | ±~+ | + |
| D-galactose | + | + |
| Inulin | − | − |
| Dextrin | +++ | +++ |
| Dulcitol | − | − |

[1] Observation based on 5 days culture at 50° C., unless otherwise specified.
Remarks.—+++=Well grown; ++=Rather well grown; +=Growth is observable; ±Hard to recognize; −=Not grown.

Test of utilizability of a carbon source according to the Pridam et al. method could not be carried out. The medium used for the utilizability of the carbon source consisted of:

| | G. |
|---|---|
| Asparagin | 1 |
| $K_2HPO_4$ | 1 |
| KCl | 0.5 |
| Agar-agar | 20 |
| Carbon source | 10 |
| $NaNO_2$ | 2 |
| $MgSO_4 \cdot 7H_2O$ | 0.5 |
| $FeSO_4 \cdot 7H_2O$ | 0.018 |

Distilled water, 1 liter.
pH 7.00.

As a result of comparison of the foregoing properties with those described in Wachsman: "The Actinomycetes (1961) 2nd edition" and Archiv fuer Mikrobiologie" 26, 373–414 (1957), it was recognized that said strains belonged to the species "Thermopolyspora polyspora." However, the present strains are different from Thermopolyspora polyspora Hansen, which is well known and akin to the present strains, in the following points:

| | Thermopolyspora polyspora Hansen | Number 429 | Number 442 |
|---|---|---|---|
| Size of spore, μ | 1.1–1.8 | 0.8–1.2 | 0.8–1.2 |
| Optimum growth temperature, °C | 60 | 50–53 | 47–53 |
| Potato plug-gg | [1] | [2] | [2] |

[1] Growable.  [2] Not grown.

Furthermore, it was recognized that both strains No. 429 and No. 442 were new strains belonging to the species Thermopolyspora polyspora, because these strains were capable of producing a thermostable and alkalistable protease, which had not been disclosed yet. Accordingly, the present inventors named these two strains "Thermopolyspora polyspora No. 429" and "Thermopolyspora polyspora No. 442," respectively.

Thermopolyspora polyspora No. 429 was deposited under an identification number of ATCC No. 21451 in American Type of Culture Collection, U.S.A., and under an identification number of "Bikokenkinki No. 442 in Biseibutsu Kogyo Gizutsu Kenkyujo of Kogyo Gijutsuin, Japan, and Thermopolyspora polyspora No. 442 was deposited under an identification number of ATCC No. 21450 in American Type of Culture Collection.

Not only said *Thermopolyspora polyspora* No. 429 and *Therompolyspora polyspora* No. 442, but also all the microorganisms which belong to the species *Thermopolyspora polyspora* and are capable of producing a thermostable and alkali-stable protease, can be used in the present invention.

A medium containing a carbon source, an inorganic or organic nitrogen source, and inorganic salts is used as a culturing medium in the present invention. Such organic or inorganic nitrogen-containing materials as soy-bean powders, cotton seed powders, wheat flour, bran, meat extract, peptone, yeast, yeast extract, urea, cornsteep liquor, ammonium salts, nitrates, etc. are used as the nitrogen source for the medium. As the carbon source, starch, dextrin, sucrose, lactose, maltose, dextrose, waste molasses, glycerine, etc. are used. As the inorganic salts, salts of calcium, magnesium, potassium, zinc, copper or other metals are used. Other components necessary for the growth of a microorganism, for example, a very small amount of nutrient substance, etc. can be added thereto. Furthermore, an animal oil, vegetable oil, mineral oil, etc. can be added thereto as a defoaming agent, if necessary.

A suitable culturing temperature for producing the enzyme is 40° to 55° C., particularly 45°–50° C. for *Therompolyspora polyspora* No. 429 and 40°–50° C. for *Thermopolyspora polyspora* No. 442. An optimum initial pH of the medium is about 7.0. Preferable culturing method is an aerobic culturing method, particularly a liquid-submerged, aerobic culturing method. An industrially optimum culturing is to utilize a jar fermentor or tank fermentor or the like, which is provided with an aeration-agitation device. Sometimes, a Waldhof fermentor or an air lift-type fermentor can be also used, depending upon a case. The culturing is completed almost within 18 to 20 hours. For example, when *Thermopolyspora polyspora* No. 429 is cultured at 50° C. by submerged aeration-agitation, an enzymatic activity of the protease becomes maximum after 20 hours from the beginning of the culturing. When *Thermopolyspora polyspora* No. 442 is cultured at 45° C. by submerged aeration-agitation, an enzymatic activity of the protease becomes maximum after 18 hours from the beginning of the culturing.

After the completion of the culturing, mycelia are separated from the cultured medium by centrifuge, filtration or the like method, and a preparate of the thermostable and alkali-stable protease can be obtained by treating the filtrate or vacuum-concentrated filtrate according to the ordinary enzyme-purification method, for example, salting-out, dialysis, chromatography, etc.

Properties of the thermostable and alkali-stable protease obtained according to the present invention are explained hereunder:

The present protease is quite stable against heat treatment at 50° C. for a duration of one hour. The residual activity of the protease has (a heat resistance of) more than 85%, after heat treatment at 70° C. for 10 minutes at a pH where the pH stability is the highest. Furthermore, the protease is stable at a pH of 7.0 to 11.0, and particularly an alkali the residual activity of the protease has an alkali resistance of more than 90% after it has been left for standing at pH 11.0 at 30° C. for 24 hours.

The optimum working pH of the present protease is about 10.5 and its optimum working temperature is about 60° to 65° C.

The heat stability of the present protease is influenced by addition thereto of such metal salts as $CaCl_2$, $MnCl_2$, $MgSO_4$, $CoCl_2$ etc.

As explained above, a large amount of protease can be produced by culturing a microorganism belonging to the species *Thermopolyspora polyspora* in a medium according to the present invention, and further the present protease is stable against heat and alkali, and it is thought that the present protease has a very high utility in the fields of food, fermentation, animal feed and pharmaceutical industires.

Now, the present invention will be explained, referring to examples.

EXAMPLE 1

*Thermopolyspora polyspora* No. 429 (ATCC No. 21451) was cultured in a medium containing 1.0% soybean powder, 2.0% dextrose, 0.25% yeast extract, 0.1% meat extract, 0.4% KCl, 0.4% $CaCO_3$, and 0.02% $K_2HPO_4$ and having an initial pH of 7.0 at 50° C. for 30 hours by submerged shaking, and 2.5 ml. of the culture was inoculated in 50 ml. of the medium having the same composition. Submerged shaking culturing was carried out at 50° C. for 50 hours, using a reciprocating type, shaker of 140 r.p.m. The pH and the protease activity during the culturing are shown in Table 2.

TABLE 2

| | pH of cultured liquor | Protease activity (unit/ml.) |
|---|---|---|
| Culturing time: | | |
| 20 | 7.0 | 0 |
| 30 | 6.8 | 520 |
| 40 | 7.2 | 730 |
| 50 | 7.5 | 920 |

Remark: Numerical values of the protease activity were obtained by the following procedure: 1 ml. of properly diluted enzyme solution was added to 5 ml. of a 0.6% casein solution. After reaction at 30° C. for a duration of 10 minutes, 5 ml. of 0.11 M trichloroacetic acid (protein-precipitating reagent) was added thereto, and the resulting precipitate was filtered off. The decomposition products in the filtrate was measured by a 275 mμ absorption method, and converted to an amount of enzyme in 1 ml. of the culture liquor (according to the casein-275 mμ absorption method disclosed in Shiro Akabori: "Koso Kenkyu No. 2"). The enzyme activity for forming non-proteinic substance which shows a 275 mμ absorption corresponding to 1γ of tyrosine for one minute was defined as one unit, $[pu]_{\eta tyr.}^{cas.}$ 275.B.

The protease activity, which is shown in the examples, has the same meaning as above.

After the completion of the culturing, the cell bodies were filtered off, and alcohol in an amount three times as much as that of a supernatant liquid was added thereto. By collecting the precipitate, 85% of the enzyme activity as shown in Table 2 could be recovered.

EXAMPLE 2

*Thermopolyspora polyspora* No. 442 (ATCC No. 21450) was cultured in a medium containing 1.0% soybean powder, 2.0% dextrose, 0.25% yeast extract, 0.1% meat extract, 0.4% KCl, 0.4% $CaCO_3$, and 0.02% $K_2HPO_4$ and having an initial pH of 7.0 at 45° C. for 25 hours by submerged shaking, and 2.5 ml. of the culture was inoculated into 50 ml. of a medium having the same composition. Submerged shaking culturing was carried out at 45° C. for 40 hours by a reciprocating type, shaker of 140 r.p.m. The pH and protease activity during the culturing are shown in Table 3.

TABLE 3

| | pH of cultured liquor | Protease activity (unit/ml.) |
|---|---|---|
| Culturing time: | | |
| 20 | 7.5 | 0 |
| 25 | 7.5 | 450 |
| 30 | 7.6 | 750 |
| 35 | 7.8 | 900 |
| 40 | 8.0 | 1,000 |

After the completion of the culturing, the cell bodies were filtered off, and alcohol in an amount three times as much as that of the supernatant liquid was added thereto. By collecting the precipitate, 90% of the activity shown in Table 3 could be recovered.

EXAMPLE 3

10 l. of the medium shown in Example 1 was charged into a 30 l.-capacity Waldhof jar fermentor, and 500 ml. of the cultured liquor obtained by culturing *Thermopolyspora polyspora* No. 429 (ATCC No. 21451) in the manner as shown in Example 1 was inoculated therein. Aeration-agitation culturing was carried out at a culturing temperature of 50° C. at an aeration rate of 15 l./min. at 300 r.p.m. for 30 hours. The pH and protease activity of the cultured liquor during the culturing are shown in Table 4.

TABLE 4

| | pH of cultured liquor | Protease activity (unit/ml.) |
|---|---|---|
| Culturing time: | | |
| 10 | 7.0 | 200 |
| 15 | 7.2 | 820 |
| 20 | 7.5 | 2,200 |
| 25 | 7.9 | 2,000 |
| 30 | 8.1 | 1,800 |

After the completion of the culturing, myceria which had grown in a pulp state, were filtered off, and 15 l. of cold alcohol was added to 5 l. of the supernatant liquid. By freeze-drying the precipitate, 26 g. of enzyme preparate was obtained. 295 units of protease were contained in 1 mg. of the enzyme preparate.

EXAMPLE 4

10 l. of a medium as shown in Example 2 was charged into a 30 l.-capacity Waldhof jar fermentor, and 500 ml. of cultured medium obtained by culturing *Thermopolyspora polyspora* No. 442 (ATCC No. 21450) in the manner as shown in Example 2 was inoculated therein. Aeration-agitation culturing was carried out at a culturing temperature of 45° C. at an aeration rate of 15 l./min. at 300 r.p.m. for 26 hours. The pH and protease activity of the cultured liquor during the culturing are shown in Table 5.

TABLE 5

| | pH of cultured liquor | Protease activity (unit/ml.) |
|---|---|---|
| Culturing time: | | |
| 10 | 6.8 | 150 |
| 14 | 7.5 | 830 |
| 18 | 8.0 | 2,300 |
| 22 | 8.2 | 2,150 |
| 26 | 8.5 | 1,500 |

After the completion of the culturing, myceria, which had grown in a pulp state, were filtered off, and 15 l. of cold alcohol was added to 5 l. of the supernatant liquid. By freeze-drying the precipitate, 32 g. of enzyme preparate was obtained. 210 units of protease were contained in 1 mg. of the enzyme preparate.

What is claimed is:

1. A method for preparing a thermostable and alkali-stable protease, which comprises culturing under an aerobic condition at a temperature of from 40° to 55° C. *Thermopolyspora polyspora* ATCC 21450 or *Thermopolyspora polyspora* ATCC 21451 in a medium, accumulating the protease in the medium and recovering the protease from the resulting medium.

2. A method according to claim 1, wherein the medium has an initial pH of 7.0.

3. A method according to claim 1, wherein the microorganism is *Thermopolyspora polyspora* ATCC 21450.

4. A method according to claim 1, wherein the microorganism is *Thermopolyspora polyspora* ATCC 21451.

References Cited

UNITED STATES PATENTS 3,579,454   5/1971   Collier _____ 195—66 R X

OTHER REFERENCES

Mizusawa et al.: Applied Microbiology, vol. 17, No. 3, pp. 366–371 (March 1969).

Desai et al.: Chemical Abstracts, vol. 71 (1969), 119866t.

Waksman: The Actinomyces, vol. II, 1961, pp. 300–309.

LIONEL M. SHAPIRO, Primary Examiner